7846X
E. Wilder.
Pantaloon Strap.
No. Patented Nov. 19. 1833.
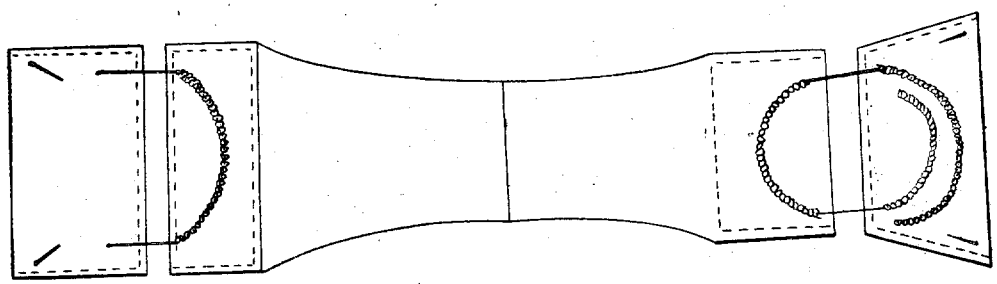
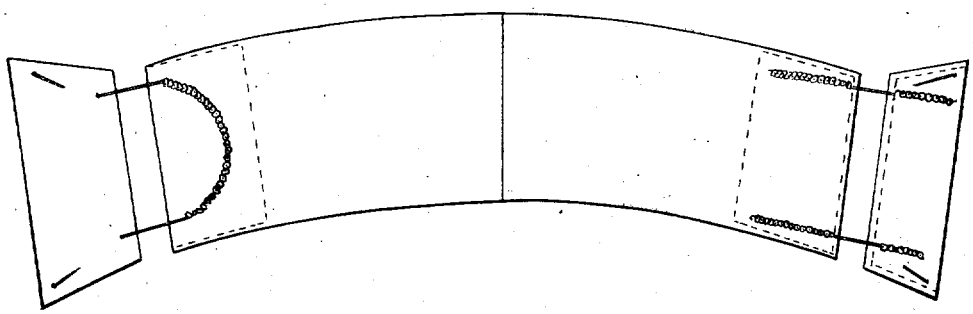
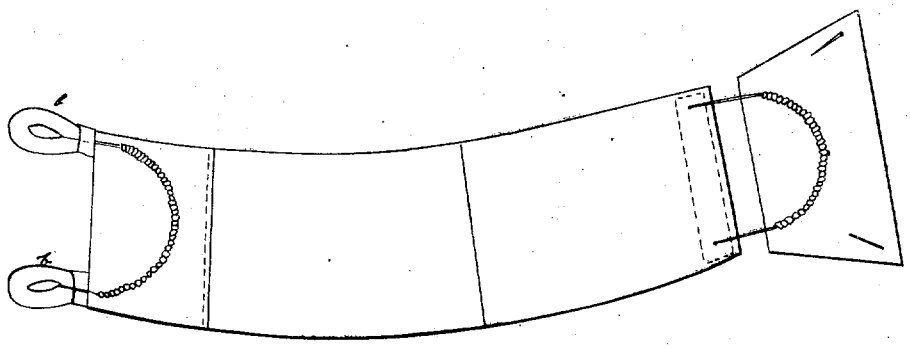

11 | 19 | 1833 1846X

Nov 19, 1833

Enos Wilder Boston. Massachusetts

Letters Patent

The Schedule referred to in these Letters Patent and making part of the same containing a description in the words of the said Enos Wilder him self of his improvement in Pantaloon straps To all to whom these presents shall come. Enos Wilder of the City of Boston in the County of Suffolk and State of Massachusetts Gentleman sends Greeting. Be it known that I the said Wilder have invented made and applied to use a new and useful improvement in pantaloon straps which invention and improvement has never been known or used before and which I describe and specify as follows. that is to say. figures numbered respectively one, two, three, four, five, and six, in the drawing hereto annexed as a part of this specification, represent parts of the pantaloon straps with the new invention and improvement. The parts A. B. C. in the several figures are to be made of leather cloth or such material whereof Pantaloon straps are usually made. Each figure is intended to represent half of an entire strap. the other half is to be made to correspond with that represented in the figure. The straps may be made in one piece entire as is represented in the figure numbered one or in several pieces as is represented in the other figures. when made of one entire piece they may be fastened to the pantaloons by loops b b as is represented in said figure numbered one, and when in several parts or pieces by button holes £ £ as is represented in the other figures or in any other convenient way. a spiral spring of brass or other suitable metal as is represented in the several figures is used. through which [illegible] or other suitable materials is made to pass and [illegible] with the loops b b or [illegible] the strap [illegible]

[illegible]

7846X

[illegible] respectively the ends of the strings of cat gut are fasten
ed d.d. to the ends of the spiral springs. The spiral springs are to be
enclosed in a case formed by fastening and securing leather cloth or othe[r]
material on the strap over the springs as is represented in the several
figures by the dotted lines. The spiral springs are to be fastened to the ends
c.c. [illegible] and prevented from being drawn out from the case in
which they are to be enclosed while the strings of cat gut or other like
material are drawn which strings are to be allowed to work easily
back and forth in the spiral spring. The advantage of the spring adapt
ed in this manner to pantaloon straps is to give elasticity to the strap
and prevent any great or sudden strain upon the pantaloons and to
keep them properly adjusted. The springs may be attached with strings
of cat gut or other suitable material passing through and working
in them in any other convenient way. The figures aforesaid being intend
ed to represent some of the most eligible ways of attaching the same
to the pantaloon straps my invention consists in the application
of spiral springs with cat gut strings or other material as afore
said passing through and working in them as aforesaid to pan-
taloon straps for the purpose aforesaid
In testimony that the above is a true specification of my invention
aforesaid I have hereto set my hand this nineteenth day of Au-
gust in the year of our Lord Eighteen Hundred and thirty three

[illegible] Witnesses
[illegible] Augustus H. Fisk Enos Wilder
B. Rand
([illegible])